(12) United States Patent
Grant et al.

(10) Patent No.: US 7,639,232 B2
(45) Date of Patent: Dec. 29, 2009

(54) SYSTEMS AND METHODS FOR CONTROLLING A RESONANT DEVICE FOR GENERATING VIBROTACTILE HAPTIC EFFECTS

(75) Inventors: Danny A. Grant, Montreal (CA); Juan Manuel Cruz Hernandez, Montreal (CA); Pedro Gregorio, Verdun (CA); Robert A. Lacroix, St. Lambert (CA); Patrice Favreau, Mascouche (CA)

(73) Assignee: Immersion Corporation, San Jose, CA (US)

( * ) Notice: Subject to any disclaimer, the term of this patent is extended or adjusted under 35 U.S.C. 154(b) by 692 days.

(21) Appl. No.: 11/291,207

(22) Filed: Nov. 30, 2005

(65) Prior Publication Data

US 2006/0119573 A1 Jun. 8, 2006

Related U.S. Application Data

(60) Provisional application No. 60/631,649, filed on Nov. 30, 2004, provisional application No. 60/634,212, filed on Dec. 8, 2004.

(51) Int. Cl.
*G09G 5/00* (2006.01)
(52) U.S. Cl. .................. 345/156; 345/161; 345/163
(58) Field of Classification Search ............... 345/156, 345/161, 163
See application file for complete search history.

(56) References Cited

U.S. PATENT DOCUMENTS 3,157,853 A 11/1964 Hirsch (Continued)

FOREIGN PATENT DOCUMENTS

EP 0 1 429 299 A1 6/2004

(Continued)

OTHER PUBLICATIONS

Adelstein, "A Virtual Environment System For The Study of Human Arm Tremor," Ph.D. Dissertation, Dept. of Mechanical Engineering, MIT, Jun. 1989.

(Continued)

*Primary Examiner*—Richard Hjerpe
*Assistant Examiner*—Leonid Shapiro
(74) *Attorney, Agent, or Firm*—Kilpatrick Stockton

(57) ABSTRACT

Systems and methods for controlling a resonant device are described. One described method for braking an actuator includes generating a first actuator signal configured to drive the actuator, the first actuator signal having a first frequency approximately resonant to the actuator, and transmitting the first actuator signal to the actuator. The method also includes generating a second actuator signal, having a second frequency approximately 180 degrees out of phase to the first frequency, the second actuator signal configured to cause a braking force on the actuator, and transmitting the second actuator signal to the actuator.

18 Claims, 6 Drawing Sheets

U.S. PATENT DOCUMENTS

| | | | |
|---|---|---|---|
| 3,220,121 | A | 11/1965 | Cutler |
| 3,497,668 | A | 2/1970 | Hirsch |
| 3,517,446 | A | 6/1970 | Corlyon et al. |
| 3,902,687 | A | 9/1975 | Hightower |
| 3,903,614 | A | 9/1975 | Diamond et al. |
| 4,160,508 | A | 7/1979 | Salsbury |
| 4,236,325 | A | 12/1980 | Hall et al. |
| 4,395,665 | A | 7/1983 | Buchas |
| 4,513,235 | A | 4/1985 | Acklam et al. |
| 4,581,491 | A | 4/1986 | Boothroyd |
| 4,599,070 | A | 7/1986 | Hladky et al. |
| 4,708,656 | A | 11/1987 | De Vries et al. |
| 4,713,007 | A | 12/1987 | Alban |
| 4,891,764 | A | 1/1990 | McIntosh |
| 4,930,770 | A | 6/1990 | Baker |
| 4,934,694 | A | 6/1990 | McIntosh |
| 5,019,761 | A | 5/1991 | Kraft |
| 5,022,407 | A | 6/1991 | Horch et al. |
| 5,035,242 | A | 7/1991 | Franklin |
| 5,038,089 | A | 8/1991 | Szakaly |
| 5,078,152 | A | 1/1992 | Bond |
| 5,186,695 | A | 2/1993 | Mangseth et al. |
| 5,212,473 | A | 5/1993 | Louis |
| 5,240,417 | A | 8/1993 | Smithson et al. |
| 5,271,290 | A | 12/1993 | Fischer |
| 5,275,174 | A | 1/1994 | Cook |
| 5,299,810 | A | 4/1994 | Pierce |
| 5,309,140 | A | 5/1994 | Everett |
| 5,334,027 | A | 8/1994 | Wherlock |
| 5,436,622 | A | 7/1995 | Gutman et al. |
| 5,466,213 | A | 11/1995 | Hogan |
| 5,547,382 | A | 8/1996 | Yamasaki |
| 5,649,020 | A | 7/1997 | McClurg et al. |
| 5,766,016 | A | 6/1998 | Sinclair |
| 5,785,630 | A | 7/1998 | Bobick et al. |
| 6,111,577 | A | 8/2000 | Zilles et al. |
| 6,219,034 | B1 | 4/2001 | Elbing et al. |
| 6,422,941 | B1 | 7/2002 | Thorner et al. |
| 2005/0052415 | A1* | 3/2005 | Braun et al. ................. 345/161 |

FOREIGN PATENT DOCUMENTS

| | | |
|---|---|---|
| EP | 1429299 | 6/2004 |
| JP | 1 428 299 A1 * | 6/2004 |

OTHER PUBLICATIONS

Adelstein, "Design and Implementation of a Force Reflecting Manipulandum for Manual Control research," DSC-vol. 42, Advances in Robotics, Edited by H. Kazerooni, pp. 1-12, 1992.

Aukstakalnis et al., "Silicon Mirage: The Art and Science of Virtual Reality," ISBN 0-938151-82-7, pp. 129-180, 1992.

Baigrie, "Electric Control Loading—A Low Cost, High Performance Alternative," Proceedings, pp. 247-254, Nov. 6-8, 1990.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings Of Fourth CISM-IFToMM, Sep. 8-12, 1981.

Bejczy, et al., "Universal Computer Control System (UCCS) For Space Telerobots," CH2413-3/87/0000/0318501.00 1987 IEEE, 1987.

Bejczy et al., "A Laboratory Breadboard System For Dual-Arm Teleoperation," SOAR '89 Workshop, JSC, Houston, TX, Jul. 25-27, 1989.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Caldwell et al., "Enhanced Tactile Feedback (Tele-Taction) Using a Multi-Functional Sensory System," 1050-4729/93, pp. 955-960, 1993.

"Cyberman Technical Specification," Logitech Cyberman Swift Supplement, Apr. 5, 1994.

Eberhardt et al., "OMAR—A Haptic display for speech perception by deaf and deaf-blind individuals," IEEE Virtual Reality Annual International Symposium, Seattle, WA, Sep. 18-22, 1993.

Eberhardt et al., "Including Dynamic Haptic Perception by The Hand: System Description and Some Results," DSC-vol. 55-1, Dynamic Systems and Control: vol. 1, ASME 1994.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Howe, "A Force-Reflecting Teleoperated Hand System for the Study of Tactile Sensing in Precision Manipulation," Proceedings of the 1992 IEEE International Conference of Robotics and Automation, Nice, France, May 1992.

IBM Technical Disclosure Bulletin, "Mouse Ball—Actuating Device With Force and Tactile Feedback," vol. 32, No. 9B, Feb. 1990.

Iwata, "Pen-based Haptic Virtual Environment," 0-7803-1363-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 150-156, 1990.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Marcus, "Touch Feedback in Surgery," Proceedings of Virtual Reality and Medicine The Cutting Edge, Sep. 8-11, 1994.

McAffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

OuhYoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Pimentel et al., "Virtual Reality: through the new looking glass," $2^{nd}$ Edition; McGraw-Hill, ISBN 0-07-050167-X. pp. 41-202, 1994.

Rabinowitz et al., "Multidimensional tactile displays: Identification of vibratory intensity, frequency, and contactor area," Journal of The Acoustical Society of America, vol. 82, No. 4, Oct. 1987.

Russo, "The Design and Implementation of a Three Degree of Freedom Force Output Joystick," MIT Libraries Archives Aug. 14, 1990, pp. 1-131, May 1990.

Russo, "Controlling Dissipative Magnetic Particle Brakes in Force Reflective Devices," DSC-vol. 42, Advances in Robotics, pp. 63-70, ASME 1992.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Terry et al., "Tactile Feedback In A Computer Mouse," Proceedings of Fourteenth Annual Northeast Bioengineering Conference, University of New Hampshire, Mar. 10-11, 1988.

PCT Search Report Issued by the European Patent Office for PCT/US2005/043583 mailed May 15, 2006.

Korean Intellectual Property Office, Notice of Preliminary Rejection, Korean Patent Application No. 10-2007-7015003, mailed Jun. 23, 2008.

* cited by examiner

SYSTEMS AND METHODS FOR CONTROLLING A RESONANT DEVICE FOR GENERATING VIBROTACTILE HAPTIC EFFECTS

CROSS-REFERENCE TO RELATED APPLICATIONS

This application claims priority to U.S. Provisional Application Nos. 60/631,649, filed Nov. 30, 2004, entitled "Systems and Methods for Controlling a Resonant Device" and 60/634,212, filed Dec. 8, 2004, entitled "Systems and Methods for Controlling a Resonant Device", the entirety of both of which are incorporated herein by reference.

FIELD OF THE INVENTION

This invention generally relates to haptic feedback device control. The present invention more particularly relates to systems and methods for controlling a resonant device.

BACKGROUND

Electronic device manufacturers strive to produce a rich interface for users. Conventional devices use visual and auditory cues to provide feedback to a user. In some interface devices, kinesthetic feedback (such as active and resistive feedback) and/or tactile feedback (such as vibration, texture, and heat) is also provided to the user, more generally known collectively as "haptic feedback." Haptic feedback can provide cues that enhance and simplify the user interface. Specifically, vibration effects, or vibrotactile haptic effects, may be useful in providing cues to users of electronic devices alerting the user to specific events, or in providing realistic feedback to create greater sensory immersion within a simulated or virtual environment.

For example, cell phones are commonly equipped with auditory and visual cues indicating an incoming telephone call. Visual cues typically include flashing lights. Auditory cues typically include a series of tones, synthesized music, or, more recently, digitally-recorded music. However, in some instances, such visual and auditory cues may not be useful to a user of the cell phone. For example, a user in a movie theater will typically have the phone's audible ringer silenced and will have the phone in a pocket and be unable to view the visual cues. In such instances, vibrotactile haptic effects are desirable.

Further, highly configurable and distinctive vibrotactile haptic effects may be desirable. For example, cell phones commonly allow a user to assign specific tones or melodies to identify incoming phone calls from specific numbers. A user may have different audible ring tones for different friends, for work, and for family members. Such differentiation of audible cues allows a user to quickly recognize not only that there is an incoming phone call, but also whom that call is from. However, as described above, in many settings, such differentiation is not possible using standard cell phones. Such phones typically have only a simplistic set of vibrations to indicate an incoming telephone call, but no mechanism for efficiently and effectively generating differentiable vibrotactile haptic effects.

SUMMARY

The present invention provides systems and methods for controlling a resonant device. One embodiment of the present invention provides a method for braking an actuator comprising generating a first actuator signal, the first actuator signal having a first frequency approximately resonant to the actuator. The first actuator signal is configured to drive the actuator. The method further comprises transmitting the first actuator signal to the actuator. The method next comprises a step for generating a second actuator signal having a second frequency approximately 180 degrees out of phase to the first frequency. The second actuator signal is configured to cause a braking force on the actuator. The method additionally comprises transmitting the second actuator signal to the actuator. In another embodiment, a computer-readable media comprises code for a carrying out such a method.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Figure 1:
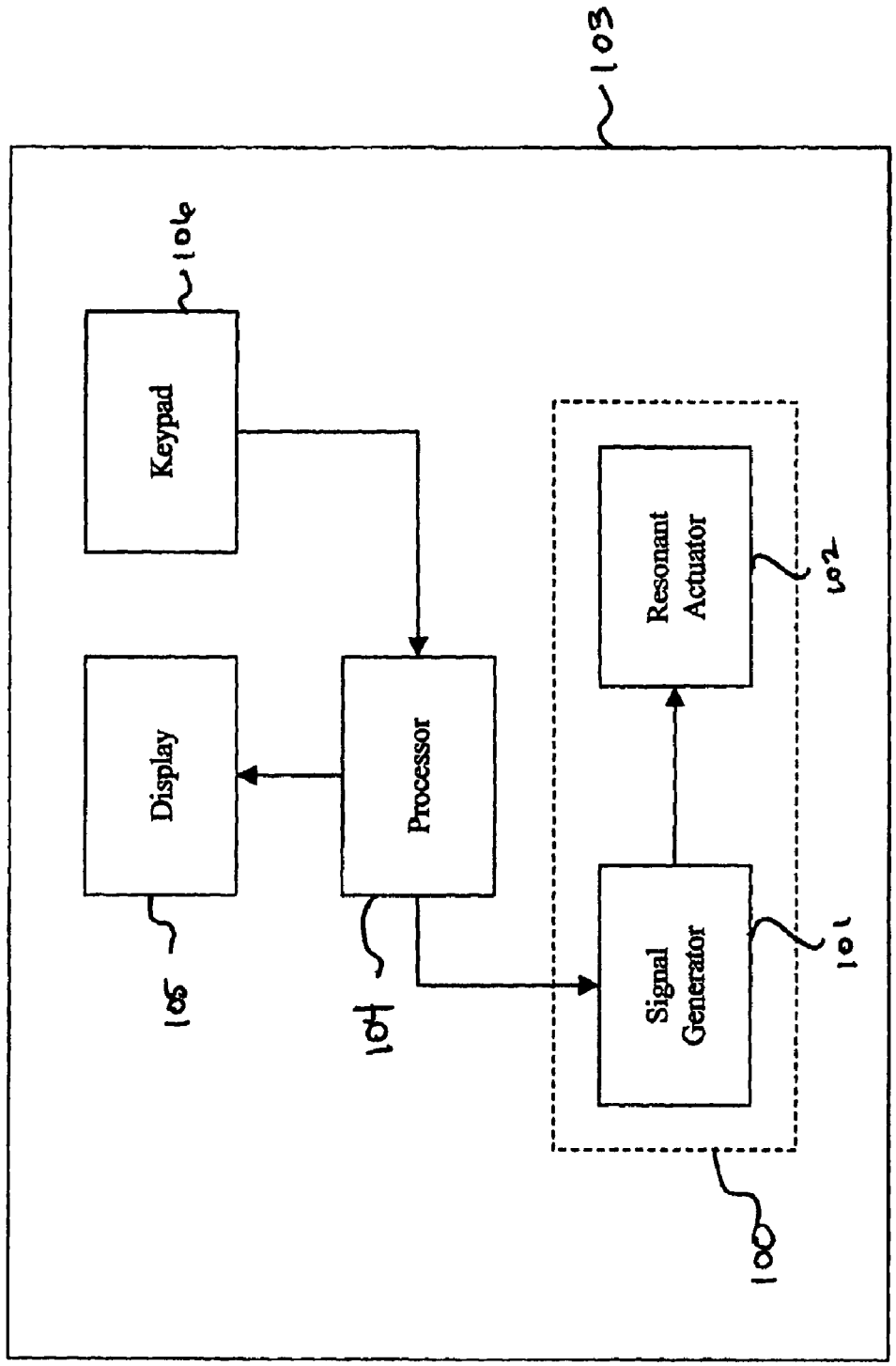
FIG. 1 is a block diagram illustrating a system for controlling a resonant device in one embodiment of the present invention.

Embodiments of the present invention provide systems and methods for controlling a resonant device.

Illustrative Controlling a Resonant Device

In one embodiment of the present invention, a cell phone has a resonant system for generating vibrations. The resonant system comprises a resonant actuator and is controlled by a processor that sends signals to the resonant system to activate and brake the actuator. For example, when the cell phone detects an incoming call, it generates a driving signal to drive the actuator at its resonant frequency to generate vibration, thereby alerting the user of the cell phone to the incoming call. Then to stop the vibrations, the cell phone generates a braking signal at the resonant frequency and approximately 180 degrees out of phase with the driving signal to brake the actuator and halt the vibrations.

By activating and braking the actuator in sequence, the cell phone can generate a wide variety of vibrotactile haptic effects. For example, an incoming call may generate three short, strong vibrations in rapid succession. The cell phone can also generate vibrotactile effects synchronized to ring tones such that the vibrotactile haptic effects correspond to the low frequencies, or bass portions, of the ring tone. The vibrotactile haptic effects can be played in time with the ring tone such that the user can feel the bass portions of the ring tone through the vibrations.

This example is given to introduce the reader to the general subject matter discussed herein. The invention is not limited to this example. The following sections describe various embodiments of systems and methods for controlling a resonant device.

Controlling a Resonant Device

Embodiments of the invention presented herein is used to decelerate a resonant actuator quickly once actuator motion is no longer desirable. By applying an inverted drive signal to the actuator (a signal that is approximately 180 degrees out of phase with the driving signal), the actuator resists the movement of the oscillating mass, forcing the oscillations to stop faster than they would with no intervention. By actively braking the actuator, the present invention is able to create vibration patterns that feel much "crisper" than would be possible if the actuator were simply allowed to return to rest with no intervention. The active braking, therefore, significantly increases the perceivable haptic bandwidth.

For example, an audible piece of music augmented with a vibration track in a resonant actuator-driven handheld device in one embodiment of the present invention is better able to produce the rapid pulses needed to augment a snare drum roll. A vibration track to a fast-paced piano solo also feels like distinct notes rather than a constant vibration of varying intensity. Many musical flourishes in several genres occur at cadences that require the high degree of actuator control that can be produced using various embodiments of the invention described herein. Thus, an advantage of embodiments of the present invention is using actuator braking to quickly stop a vibrating actuator in order to generate more compelling and pleasing haptic effects.

Referring now to the drawings in which like numerals indicate like elements throughout the several Figures, FIG. 1 is a block diagram illustrating a system 100 for braking an actuator in one embodiment of the present invention. The system 100 comprises a signal generator 101. There are many types of signal generators that may be used as the signal generator 101 including but not limited to:

Digital/Analog ("D/A") conversion
(a) with high sampling rate, or
(b) with low sampling rate and filtering;
Pulse Width Modulation ("PWM") with filtering;
Analog Oscillator;
PWM with amplitude control and an invert input/output ("I/O") line; and
PWM with adjustable frequency.

A D/A converter can be used to drive a resonant device at the resonant frequency of the device. A fundamental drive signal may be a sinusoid at approximately the resonant frequency of the device. If the available sampling rate of the D/A converter is not high enough to ensure a smooth sinusoid, passive filtering can be used to smooth the drive signal in order to reduce audio noise.

Some resonant devices create significant audio noise when driven with square wave signals. To reduce the noise, sinusoid signals can be used that have less high frequency components. Other resonant devices do not create much audio noise and can be driven by square wave signals. For these devices, the signal generator can be simplified as the drive signal can be a resonant square wave.

In some embodiments, it may be advantageous to use a band pass filter to extract the component of a square signal at the desired frequency. In such an embodiment, it may be advantageous to extract a sinusoid at approximately the same frequency as the square signal. The filter may be implemented physically with passive or active components in order to avoid sampling frequency issues and quantization problems. Generation of the same sinusoid signal in software may require higher output resolution as well as higher sampling frequencies.

In other embodiments, a bidirectional PWM signal can be used to drive the resonant device. The amplitude of the signal driving the resonant device may be modulated by controlling the "on" time of the PWM signal while driving at the resonant frequency. Filtering can also be used to smooth out the square nature of this signal if required.

An alternate way to generate the drive signal is to use an analog oscillator, where the oscillator may be set approximately to the resonant frequency. The amplitude of the drive signal may be controlled with an available D/A converter and an amplifier.

In one embodiment of the present invention, a circuit using PWM with amplitude control and an I/O invert line can be used to generate a PWM signal to drive a resonant actuator and control amplitude of the signal. The PWM signal is set at the resonant frequency of the resonant actuator. In such an embodiment, the amplitude control is achieved with a second PWM connected to an amplifier, the second PWM generates a modulating signal and controls the amplitude of first and second actuator signals by varying the pulse width of the modulating signal.

In the embodiment described above, the I/O invert line is used to control signal inversion by transmitting an invert signal. For example, when the invert signal is low, the PWM signal is passed to the resonant actuator. When the invert signal is high, a switch can reverse the leads of the resonant actuator effectively inverting the PWM signal. In other embodiments, the signal may be inverted by other methods including, but not limited to, gating in a different signal source or inverting the drive signal using logic gates. In this manner, one external control line can be used to invert the PWM signal at the suitable time in order to brake the resonant actuator.

In one embodiment, only a single PWM signal may be available which can be level shifted to produce a bidirectional signal. In such an embodiment, the amplitude is partially controlled by varying the duty cycle. Full amplitude is achieved when the PWM signal is set at the resonant frequency of the resonant actuator and to generate a PWM signal with a 50% duty cycle. Due to the band pass nature of the resonant actuator, signals that are different than 50% duty cycle will result in generating a lower amplitude of vibration. Controlling the amplitude of vibrations could also be achieved by varying the PWM drive frequency.

The amplitude-modulating technique in the embodiment described above may require transmitting the PWM signal through a band pass filter before transmitting the PWM signal to the resonant actuator. The band pass filter may be made with discrete components and would help ensure that the resonant device has a drive signal that matches with the resonant frequency. The amplitude of the drive signal might be controlled through modifications of the PWM as above.

In one embodiment, the signal generator 101 may comprise a processor or processors (not shown). The processor comprises a computer-readable medium, such as a random access memory (RAM) coupled to the processor. The processor executes computer-executable program instructions stored in memory, such as executing one or more computer programs for generating vibrotactile haptic effects. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMS), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, such as a router, private or public network, or other transmission device or channel. The processor, and the processing, described may be in one or more structures, and may be dispersed through one or more structures. The processor may comprise code for carrying out one or more of the methods (or parts of methods) described herein.

Referring still to FIG. 1, the system 100 for braking an actuator further comprises a resonant actuator 102. In one embodiment, the resonant actuator 102 comprises a mass that may be vibrated. One method for generating a vibration in the mass is to oscillate the mass at a resonant frequency such that the oscillation may be felt as a vibration.

A resonant frequency is a natural frequency of oscillation for a system. If a complex waveform is applied to a resonant system, the resonant system will initially move based on the complex waveform, however, if the input waveform is halted, the resonant system will tend to settle its movement to a resonant frequency. Energy applied to the system at the system's resonant frequency will result in a response that is greater in amplitude than other input frequencies. In generating a vibration, it may be advantageous to drive a resonant system at its natural frequency to take advantage of its gain.

Various systems that are capable of vibration include resonant actuators. Common types of resonant actuators include linear resonant actuators. Other types of resonant actuators may be used in an embodiment of the present invention as well, including, but not limited to, multi-function resonant actuators, which can create both audio and vibrations. Embodiments of the present invention may use any type of resonant actuator of suitable size that may be driven by a signal.

A further characteristic of resonant systems is the time it takes the system to return to a resting state, referred to herein as the decay time. Such a decay time is a limiting factor on the ability of resonant actuators to generate vibrotactile haptic effects. If a vibrotactile haptic effect must be terminated faster than a resonant system would decay unimpeded, the effect may not be capable of generation, or the effect may not be accurately generated by the actuator, due to the decay time of the resonant system. By implementing embodiments of the present invention, it may be possible to generate a braking force on an actuator such that the actuator is slowed at a faster rate than it would without the braking force. The increased braking speed may allow shorter, crisper vibrotactile haptic effects to be generated. It also may allow multiple vibrotactile haptic effects to be generated with very little time needed to brake the actuator between the effects.

The signal generator 101 is in communication with the resonant actuator 102. Any type of communication link configured to transmit a signal may be used including, but not limited to, a circuit; a network; a wireless communications link including but not limited to 802.11 wireless Ethernet, radio frequency transmission/reception or Bluetooth; a system bus; USB; or FireWire.

The signal generator 101 is configured to generate a first and a second actuator signal and to transmit the first and second actuator signals to the resonant actuator 102. The first actuator signal has a frequency approximately equal to the resonant frequency of the resonant actuator 102 and is configured to drive the actuator 102. The second actuator signal has approximately the frequency of the first actuator signal and a phase approximately 180 degrees out of phase to the first actuator signal. The second actuator signal is configured to cause a braking force on the actuator 102.

In the embodiment shown in FIG. 1, a housing 103 comprises the system 100 for braking an actuator, a processor 104, a display 105, and a keypad 106. The housing 103 may be, for example, a housing of a cell phone, personal digital assistant or other electronic device. While a display 105 and keypad 106 are shown in the embodiment of FIG. 1, other embodiments may not include a display or keypad. During operation, the cell phone 103 may need to generate a vibrotactile haptic effect. The processor 104 may send a command to the signal generator 101. In one embodiment, the command may comprise a vibrotactile haptic effect envelope. In other embodiments, the command may comprise a command to generate a first actuator signal. In still other embodiments, the command may comprise a command to generate a second actuator signal. Still other commands not listed here may be transmitted to the signal generator. The processor 104 may also send a command to the display 105. Upon receiving the command, the signal generator 101 may generate first and second actuator signals and transmit those signal to the resonant actuator 102 to generate a vibrotactile haptic effect.

In one embodiment of the present invention, the first actuator signal comprises a modulated amplitude and the second actuator signal comprises a signal transmitted at approximately the maximum amplitude that the signal generator 101 can generate. The modulated amplitude of the first signal allows for control over the acceleration of the resonant actuator. Use of an approximately maximum magnitude second actuator signal generates approximately the maximum braking force on the actuator. Maximum magnitude is generated by generating a signal using the maximum rated voltage of the actuator. Deceleration of the actuator in such an embodiment may be regulated by the duration for which the second actuator signal is transmitted to the actuator. This embodiment may be advantageously used in conjunction with a vibrotactile haptic effect envelope such that the modulated amplitude of the first actuator signal and the duration of the second actuator signal may be used to control the acceleration of the actuator to closely track the contours of the vibrotactile haptic effect envelope.

In another embodiment similar to the previous embodiment, the second actuator signal may instead have a modulated amplitude whereby the braking force on the actuator may be regulated by varying the amplitude of the second actuator signal. This embodiment, like the previous example, may be advantageously used in conjunction with a vibrotactile haptic effect envelope such that the modulated amplitude of the first actuator signal and the amplitude of the second actuator signal may be used to control the acceleration of the actuator to closely track the contours of the vibrotactile haptic effect envelope. Vibrotactile haptic effect envelopes are discussed more fully in the description of FIG. 4 below.

In one embodiment, modulating the amplitudes of the first and second actuator signals may be accomplished by using a modulator. Such a modulator is configured to receive the first and second actuator signals, and modulate the first and second actuator signals based at least in part on a modulating signal, the modulating signal generated by the signal generator.

The preceding examples are illustrative and are not intended to limit the breadth or scope of the present invention. Embodiments are not limited to cell phones and other devices may advantageously employ the invention including, but not limited to, personal digital assistants (PDAs); handheld gaming devices including portable gaming systems and controllers; virtual reality simulators including but not limited to flight simulators, driving simulators, medical procedure simulators; or remote controlled devices. Still other embodiments may comprise a daughterboard or an ASIC with the systems and methods of the present invention incorporated therein.

Further, there are many more embodiments which may generate many different varieties of vibrotactile effects including, but not limited to, substantially periodic pulses with lower frequency than the resonant frequency of the actuator, an amplitude sweep (magsweep), effect whereby the amplitude of the output signal is increased substantially linearly from about 0 to a maximum amplitude and then decreased substantially linearly to about 0, or any other vibrotactile haptic effect that may provide vibrotactile haptic feedback to a user.

Figure 2:
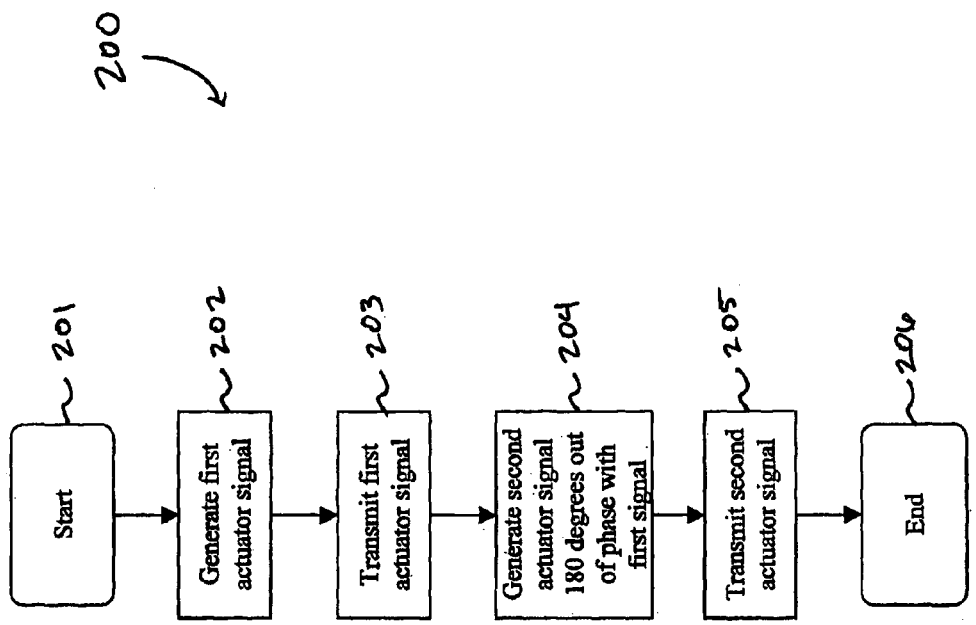
FIG. 2 is a flowchart illustrating a method for braking an actuator in one embodiment of the present invention.

FIG. 2 is a flowchart illustrating a method 200 for braking an actuator in one embodiment of the present invention. The methods herein are described in relation to the system of FIG. 1. However, the methods may be implemented in a variety of systems other than that shown in FIG. 1. The method 200 begins at block 201 and ends at block 206. In the embodiment shown in FIG. 2, the system 100 for braking an actuator generates a first actuator signal 202. The first actuator signal has a frequency approximately resonant to the actuator 102 and is configured to drive the actuator 102. In other embodiments, the system 100 for braking an actuator may receive a command from the processor 104 to generate an effect. In one embodiment, such a command may be simple and specify only an amplitude. In other embodiments, such a command may be complex and specify a vibrotactile haptic effect envelope and cause the system 100 for braking an actuator to determine the proper amplitude and duration for one or more vibrotactile haptic effects to be generated. A more detailed description of vibrotactile haptic effect envelopes is discussed in relation to FIG. 4. In still further embodiments, the processor 104 may specify commands of lesser complexity than a full effect envelope, but of greater complexity than only an amplitude. And other embodiments may generate vibrotactile haptic effects based upon a determination made by the system for braking an actuator 100.

Once the first actuator signal has been generated 202, the system 100 for braking an actuator transmits the first actuator signal to the actuator (102) 203. In the embodiment shown, the first actuator signal is transmitted directly to the actuator 102. In other embodiments, the signal may travel through other components or systems prior to reaching the actuator 102. For example, the signal may pass through a filter. In another embodiment, the signal may pass through an amplifier or a logic gate. In further embodiments, the first actuator signal may be combined with another signal or multiple other signals. Still further embodiments will be apparent to one of ordinary skill in the art.

In the embodiment shown, the signal generator 101 also generates a second actuator signal 204. In some embodiments, the signal generator 101 may generate the first actuator signal prior to generating the second actuator signal. In other embodiments, the two signals may be generated concurrently. In further embodiments, the second actuator signal may be generated prior to generating the first actuator signal.

The second actuator signal has approximately the frequency of the first actuator signal and a phase approximately 180 degrees out of phase with the first actuator signal. The second actuator signal is configured to cause a braking force on the actuator 102. In some embodiments, the system 100 for braking an actuator may be commanded to generate the second actuator signal by another processor or system. For example, the processor 104 may transmit a command to the signal generator 101 to generate a first actuator signal, causing the signal generator 101 to generate the first actuator signal. In other embodiments, the system 100 for braking an actuator may generate the second actuator signal without receiving a command from another processor or system. In embodiments where the system 100 for braking an actuator is commanded to generate the second actuator signal, the command may be very simple, for example, including only an amplitude. Continuing the previous example, the processor 104 may, subsequent to commanding the signal generator 101 to generate the first actuator signal, may command the signal generator 101 to generate the second actuator signal, causing the signal generator to generate the second actuator signal. In other embodiments, the command may be complex, for example, including an effect envelope. In still further embodiments, the command may be more complex than an amplitude, but less complex than an effect envelope.

In embodiments where the system 100 for braking an actuator generates the second actuator signal without receiving a command, a decision to generate the second actuator signal may be based at least in part on a duration for a vibrotactile haptic effect. In other embodiments, the decision may be based at least in part on an amplitude for a vibrotactile haptic effect. For example, in one embodiment, the system 100 for braking an actuator may decide to generate a second actuator signal having less than maximum amplitude based on the relatively small amplitude of the vibrotactile haptic effect being generated by the actuator 102. In still further embodiments, the decision may be based at least in part on an effect envelope. For example, in one embodiment, an effect envelope may specify a change from a maximum amplitude of vibration to an intermediate amplitude of vibration. In such an embodiment, the system 100 for braking an actuator may generate a second actuator signal having a relatively small amplitude to cause a relatively small braking force on the actuator.

After generating the second actuator signal 204, the system 100 for braking an actuator transmits the second actuator signal to the actuator 205. In the embodiment shown, the second actuator signal is transmitted directly to the actuator 102. In other embodiments, the signal may travel through other components or systems prior to reaching the actuator 102. For example, the signal may pass through a filter. In another embodiment, the signal may pass through an amplifier or a logic gate. In further embodiments, the second actuator signal may be combined with another signal or multiple other signals. Still further embodiments will be apparent to one of ordinary skill in the art.

Figure 3:
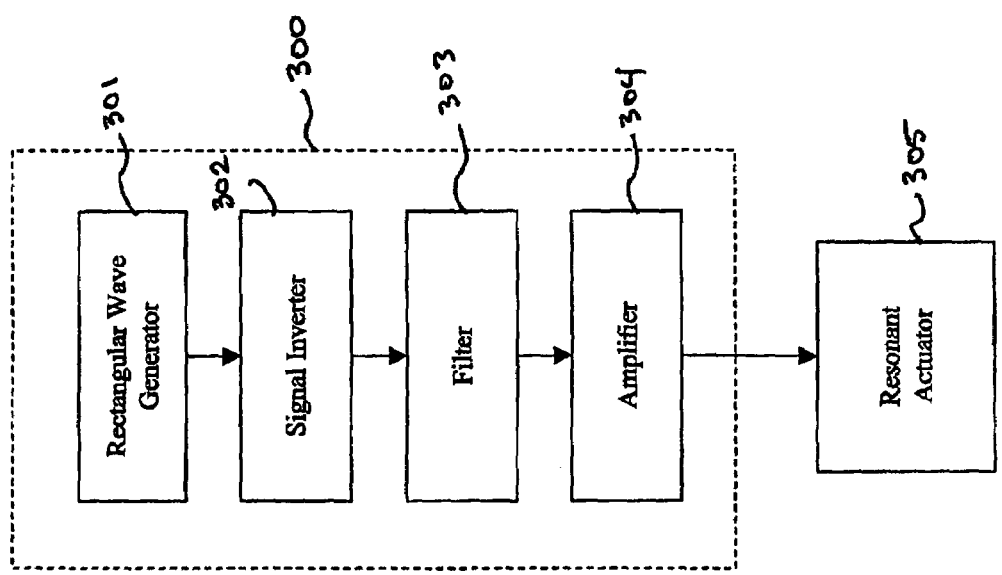
FIG. 3 is a block diagram illustrating components of a signal generator in one embodiment of the present invention.

FIG. 3 is a block diagram illustrating components of a signal generator 300 in one embodiment of the present invention. The embodiment of a signal generator 300 shown in FIG. 3 comprises a rectangular wave generator 301, a signal inverter 302, a filter 303, and an amplifier 304. The signal generator 301 is configured to generate a first rectangular wave having a frequency approximately equal to the resonant frequency of the actuator 305.

The signal inverter 302 is configured to generate a second rectangular wave having approximately the same frequency as the first rectangular wave and a phase approximately 180 degrees out of phase with the first rectangular wave. The signal inverter 302 is further configured to be either enabled or disabled. If the signal inverter 302 is disabled, the signal inverter will not generate the second rectangular wave and only the first rectangular wave will be transmitted to the filter 303. In some embodiments, the first rectangular wave will pass through the signal inverter 302 without being inverted. In other embodiments, the first rectangular wave will bypass the signal inverter 302 and be transmitted directly to the filter 303. If the signal inverter 302 is activated, it will generate the second rectangular wave and only the second rectangular wave will be transmitted to the filter 303.

In one embodiment, the signal inverter 302 comprises an exclusive-OR gate ("XOR gate") configured to receive a first rectangular wave and a logic state and output a second rectangular wave. A logic state may have a value of 0 or 1. The values of the logic state may further be described as low or high. In some embodiments, a low value may correspond to a value of 0 and a high value may correspond to a value of 1. In other embodiments, a low value may correspond to a value of 1 and a high value may correspond to a value of 0. In the embodiment, the XOR gate receives the first rectangular wave and the logic state. If the logic state is 0, the XOR gate generates a second rectangular wave having approximately the same frequency as the first rectangular wave and a phase approximately the same as the first rectangular wave. The signal inverter 302 then transmits the second rectangular wave to the filter 303. If the logic state is 1, the XOR gate generates a second rectangular wave that has approximately the same frequency as the first rectangular wave and a phase that is approximately 180 degrees out of phase with the first rectangular wave. The signal inverter 302 then transmits the second rectangular wave is transmitted to the filter 303. Some embodiments of the present invention may not comprise a filter. In such embodiments, the signal inverter 302 may transmit the second rectangular wave to the amplifier 304. In other such embodiments, the signal inverter 302 may transmit the second rectangular wave to another component of the signal generator 300.

The filter 303 is in communication with the signal inverter 302, and the filter 303 is configured to convert a rectangular wave to a substantially-sinusoidal wave of approximately the same frequency and phase as the rectangular wave. The filter 303 may be created using a variety of components including, but not limited to, a processor, a D/A converter, or an electronic circuit.

The amplifier 304 of signal generator 300 is configured to generate an amplified signal based at least in part on the output of the filter 303 and is further configured to drive the resonant actuator 305. In some embodiments, the amplifier 304 may comprise an operational amplifier. In further embodiments, the amplifier 304 may comprise a processor. In still further embodiments the amplifier 304 may comprise an electronic circuit. One of ordinary skill in the art would be familiar with embodiments not described here configured to generate an amplified signal based at least in part on the output of the filter and further configured to drive the actuator 305.

It may be advantageous to use an embodiment like the one shown in FIG. 3 when a signal generator capable of generating substantially-sinusoidal waves to drive an actuator is not readily available. In some embodiments where a signal generator capable of generating a substantially-sinusoidal wave is not available, other components may be available to generate a rectangular wave, which can then be converted to a substantially-sinusoidal wave using, for example, a bandpass filter. For example, a cell phone may be capable of generating a rectangular wave, but not a substantially sinusoidal wave. With the addition of a relatively simple band pass filter comprising resistors and capacitors, the rectangular wave may be converted into a substantially-sinusoidal wave, which may then be passed through an amplifier to generate actuator signals configured to drive an actuator, or to generate a braking force on an actuator.

Further embodiments of the present invention may not comprise a filter 303. A filter may be not be used in some embodiments where, for example, the resonant actuator 305 may be driven using a rectangular wave or an unfiltered signal may be better suited to drive the resonant actuator 305.

Figure 4:
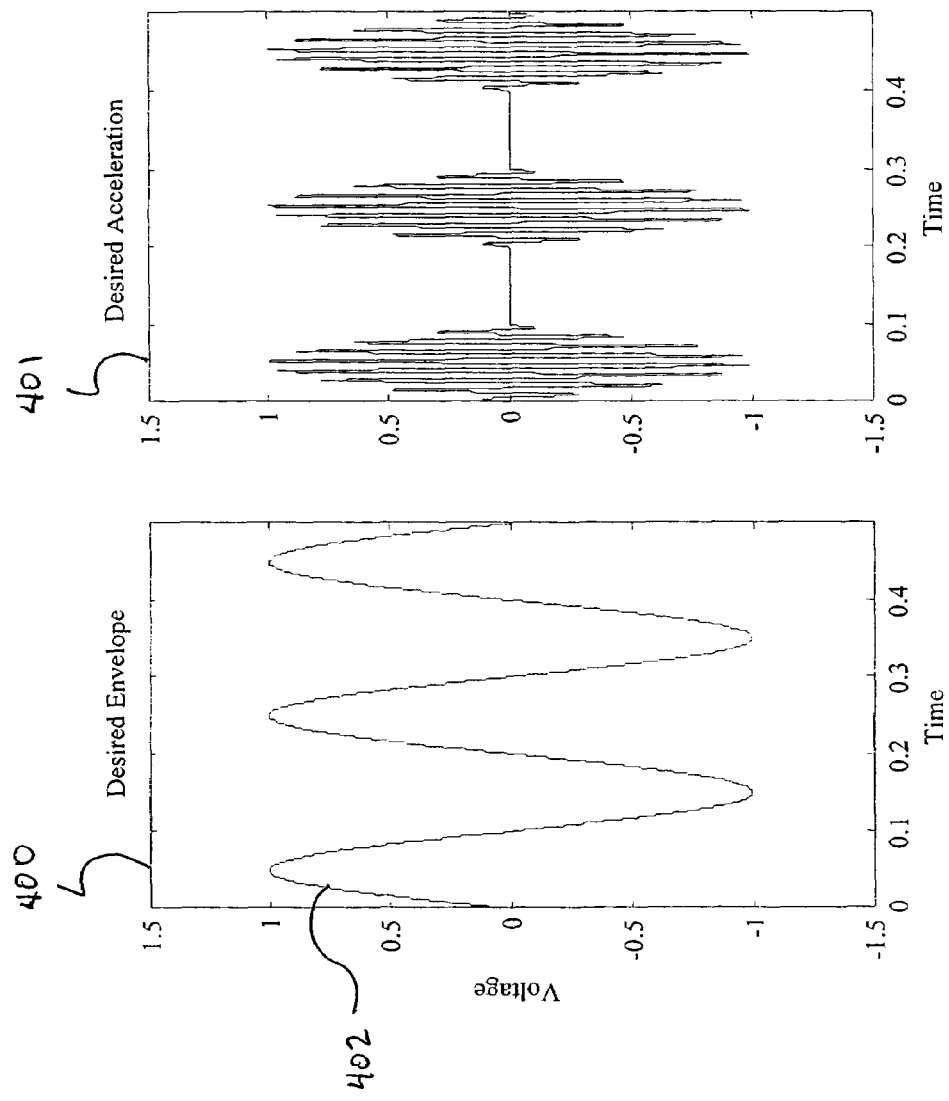
FIG. 4 shows two graphs illustrating a simulated low frequency wave using a vibrotactile haptic effect envelope and a resonant actuator with a higher frequency than the vibrotactile haptic effect envelope in one embodiment of the present invention.

FIG. 4 shows two graphs 400, 401 illustrating a simulated low frequency wave using a vibrotactile haptic effect envelope ("envelope") and a resonant actuator with a higher frequency than the envelope in one embodiment of the present invention. Resonant devices are designed to operate in a narrow band of frequencies according to system properties. This provides significant amplification in the output response that is required to make this technique feasible from the user's perspective.

However, driving the system at resonance at all times limits the dynamic range of the vibrotactile haptic effects that can be displayed with the device. Therefore, an envelope may be desired that transforms the specific actuator resonant frequency to a range of desired vibrotactile haptic effects. The envelope may take into consideration the frequencies of the desired vibrotactile haptic effects as well as their waveform shapes.

In one embodiment, a vibrotactile haptic effect may comprise vibrations configured to simulate the vibrations of a car's engine. The engine speed envelope may comprise a low frequency, low amplitude envelope to simulate the engine at an idle speed. The engine speed envelope may further comprise a high frequency, high amplitude envelope to simulate the engine running at very high RPMs. The engine speed envelope may further comprise other envelopes including but not limited to envelopes to simulate acceleration where the frequency and amplitude of the envelope increases, or envelopes to simulate deceleration where the frequency and amplitude of the envelope decreases.

Envelopes do not change the resonant frequency of the actuator. Instead, frequencies lower than the resonant frequency may be simulated by periodically varying the amplitude of the signal driving the actuator at resonance. Further, the amplitude of the envelope may be varied by varying the maximum amplitude of the signal driving the actuator at resonance. For example, graph 400 shows an envelope 402 of a substantially sinusoidal wave having a frequency lower than the resonant frequency of a resonant actuator. Graph 401 shows the vibration of the resonant actuator as the amplitude of the actuator's vibrations are modulated to track the envelope 402. The envelope 402 describes a wave of varying amplitude, which is then generated by varying the amplitude of the vibrations of the actuator, as shown in graph 401.

The graph 401 shows the amplitude of the actuator response increasing rapidly from a low amplitude to a higher amplitude and returning to a low amplitude. To generate actuator motion such that the actuator motion tracks the haptic envelope, a first and second actuator signal may be used to drive and brake the actuator. In the embodiment shown, the first actuator signal comprises an amplitude or duration based at least in part on the vibrotactile haptic effect envelope, and the second actuator signal comprises an amplitude or duration based at least in part on the vibrotactile haptic effect envelope. The first actuator signal drives the actuator at resonance, thereby causing the actuator to accelerate. The amplitude or the duration of the first signal may be used to control the acceleration or steady-state motion of the actuator such that the vibration of the actuator tracks the haptic envelope. The second actuator signal brakes the actuator, thereby causing the actuator to decelerate to track the haptic envelope. The amplitude or the duration of the second signal may be used to control the deceleration of the actuator such that the vibration of the actuator tracks the haptic envelope. A more detailed description of the braking signal and its effect on the actuator can be found in reference to FIG. 6 below.

In the embodiment shown, the first and second actuator signals are transmitted to the actuator in sequence to generate an actuator response that closely tracks the haptic envelope. Thus, by varying the amplitude of the actuator's vibrations at resonance, frequencies lower than the resonant frequency of the actuator may be generated having a wide variety of amplitudes. The preceding example illustrates a further advantage of embodiments of the present invention, which is not only decreased braking time, but also an increased ability to generate actuator responses that very closely track a the shape of desired vibrotactile haptic effect, represented by an envelope, by applying an suitable braking signal to the actuator.

As described, an envelope is a function that defines the "shape" or "feel" of a vibrotactile haptic effect to be generated by an actuator. Envelopes may describe a wide variety of vibrotactile effects. For example, one embodiment, as described above, may comprise a substantially periodic signal having a frequency lower than the resonant frequency of the resonant actuator. Other embodiments may comprise non-periodic or arbitrary envelopes describing vibrotactile effects having constant and/or changing amplitudes and/or frequencies.

Figure 5:
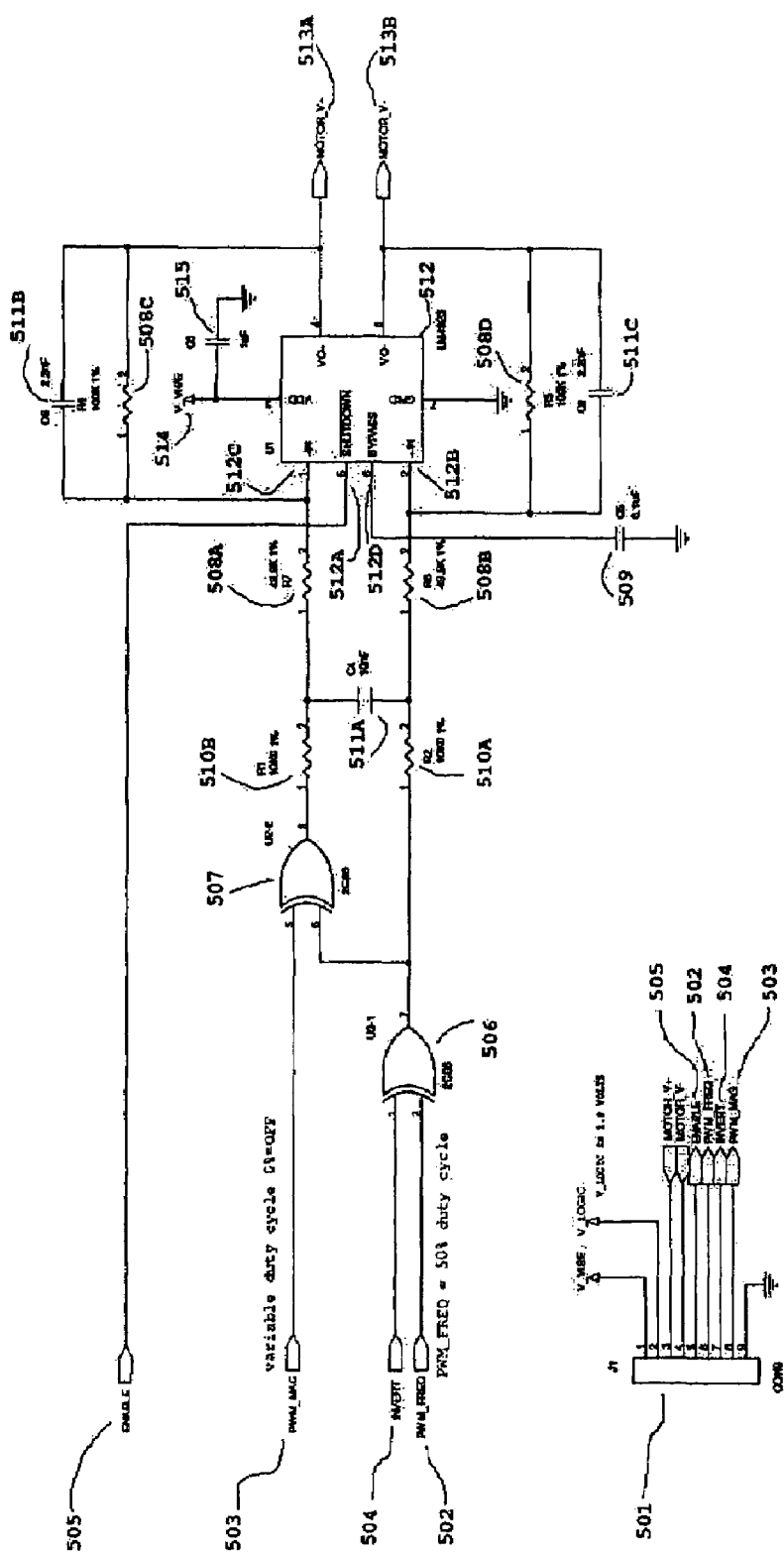
FIG. 5 is a circuit diagram of a signal generator in one embodiment of the present invention.

FIG. 5 is a circuit diagram 500 of a signal generator in one embodiment of the present invention. The drive circuit shown in FIG. 5 is based on a low cost filter-less high efficiency (approximately 1.1-1.3 Watt) audio amplifier 512. The amplifier 512 may be powered directly from the battery voltage 514 to minimize the implementation cost.

In one embodiment, the drive circuit uses four control signals: ENABLE 505, (polarity) INVERT 504, PWM_FREQ 502, and PWM_MAG 503.

The ENABLE 505 signal is active high: A low will disable the audio amplifier 512. A high state will enable the audio amplifier 512.

The INVERT 504 signal is used to stop the actuator by inverting the phase of PWM_FREQ 502. It is normally set to a logic value of 0, but is switched to a logic value of 1 for the duration required to stop the motion. Leaving it set to a logic value of 1 longer may cause the motion to start in the opposite phase. The timing of the INVERT 504 signal may be calculated and applied by the system 100 for braking an actuator. In other embodiments, the timing of the INVERT 504 signal may be calculated and applied by a processor.

The PWM_FREQ 502 signal may be set to the actuator's fundamental resonant frequency. In operation the PWM_FREQ 502 duty cycle may be set at 50%. The frequency may be set in accordance with the actuator's specified resonant frequency. The actuator's resonant frequency may fall within a tolerance. Accordingly, the level of vibration could be significantly different from device to device if this tolerance is too high.

The PWM_MAG 503 signal is set at a higher switching frequency than PWM_FREQ 502. A frequency of 20 Khz may provide quiet operation. In other embodiments, other operating frequencies may be used. The level of voltage that may be applied across the actuator's leads may vary proportionately with the duty cycle of PWM_MAG 503.

Assuming a 1.8 Volts supply on the XOR gates 506, 507 and an actuator that requires 2.3V RMS, the voltage gain is 1 and is matched to the duty cycle, for example a 75% duty cycle represents 75% of the maximum output of the motor. The voltage gain is adjusted by selecting a matched ratio of resistors 508C to 508A and resistors 508D to 508B. In other embodiments, the maximum duty cycle may be less than 100% to respect the actuator specifications if the gain is more than 1.

In one embodiment, the circuit does not filter down the harmonics of the fundamental frequency resulting in a quasi-square wave, increasing the energy supplied to the actuator. In such an embodiment, the "vibration" gain is increased from what would be a sinusoid waveform.

The logic levels of the XOR gates 506, 507 are compatible with the signal generator 501 1.8 Volts logic level since the XOR gates 506, 507 are also powered with the same 1.8V supply. The INVERT 504, PWM_FREQ 502 and PWM_MAG 503 signals drive the XOR gates 506, 507 directly. The ENABLE 505 signal is also the same 1.8V logic level. In other embodiments, the logic level may need to be shifted to insure compatibility with the logic source.

XOR gate 506 generates the signal for the + input of the audio amplifier 512*b*. The signal is a square wave that can inverted by setting INVERT 504 to a logic state of 1, or can be transmitted without modification by setting INVERT 504 to a logic state of 0.

XOR gate 507 generates the signal for the −input of the audio amplifier 512*c*. This is approximately a 20 kHz variable duty cycle rectangular wave. The polarity of the pulses are inverted in relation to the output of the other XOR gate 506.

The signal formed by the XOR gates 506, 507 is filtered to reduce high frequency content for the amplifier 512. Resistors 510*a*, 510*b* and capacitor 511*b*, 511*c* form a low pass filter. Capacitor 515 provides decoupling for the amplifier 512. Capacitor 509 provides decoupling to the internal circuits of the amplifier.

Figure 6:
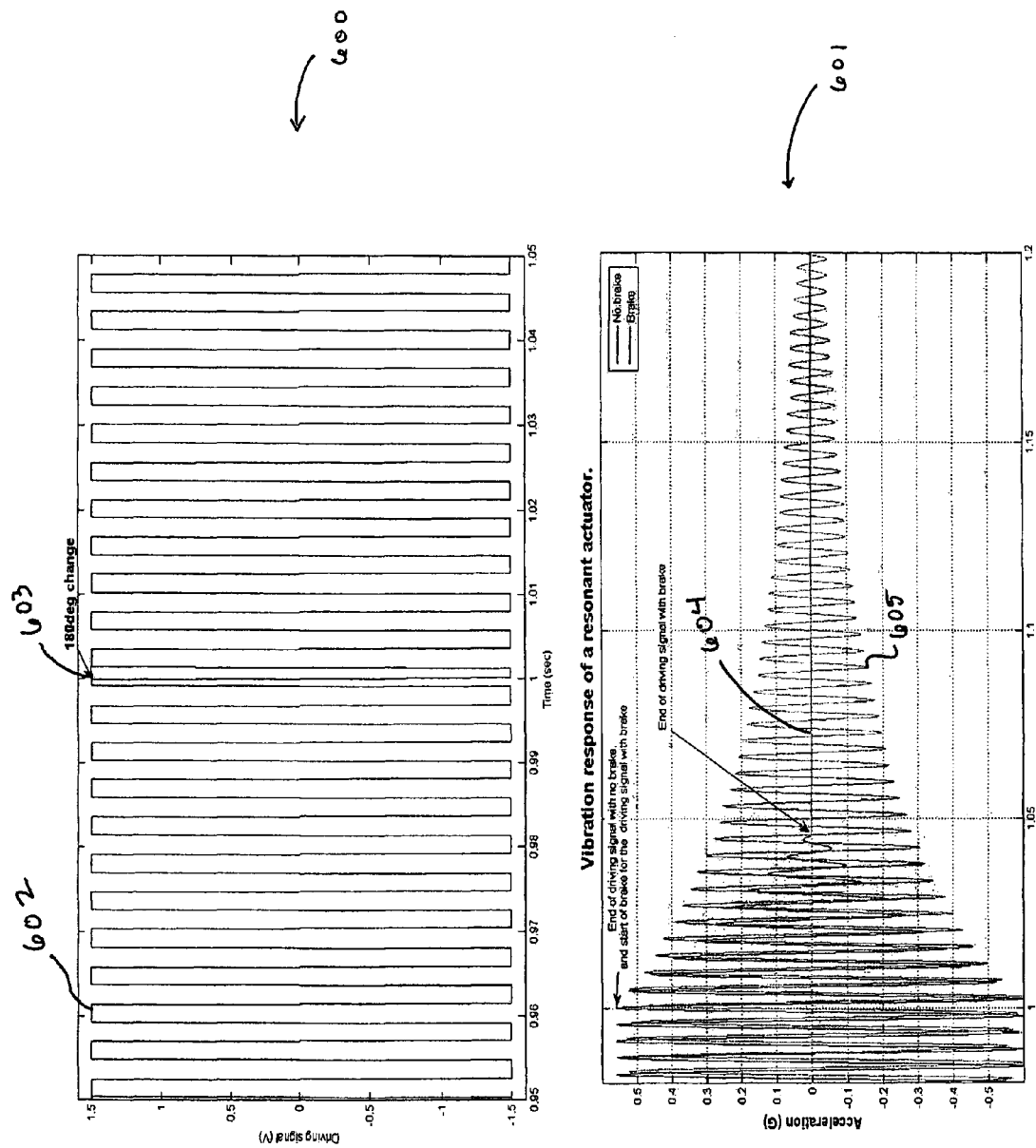
FIG. 6 shows a graph illustrating the inversion of a signal driving a resonant actuator and a graph illustrating a comparison between the motion of a first resonant actuator driven by the signal and the motion of a second resonant actuator allowed to return to rest without braking in one embodiment of the present invention.

Signal generator 501, in the embodiment shown, generates rectangular waves PWM_FREQ 502 and PWM_MAG 503 using pulse-width modulation. Other embodiments may generate rectangular waves using other methods including, but not limited to, ripple counters, D/A converters, oscillators, ADCs, or a processor. PWM_FREQ 502 may be set to the actuator's fundamental resonant frequency. In operation the duty cycle of the pulse-width modulation may be set at 50%. PWM_MAG 503 may be set at a higher frequency than PWM_FREQ 502. A frequency of 20 Khz may provide quiet operation. In other embodiments, other operating frequencies may be used. The amplitude of an actuator signal that may be applied to the actuator may vary proportionately with the duty cycle of PWM_MAG 503. FIG. 6 shows a graph 600 illustrating the inversion of a signal 602 driving a resonant actuator and a graph 601 illustrating a comparison between the motion of a first resonant actuator 604 driven by the signal 602 and the motion of a second resonant actuator 605 allowed to return to rest without braking, in one embodiment of the present invention. Graph 600 shows a signal 602 configured to drive a resonant actuator. The signal 602 is a rectangular wave with a frequency approximately resonant to the actuator. When time is approximately equal to 1 second, the signal 602 is inverted 603. The inversion 603 of the signal 602 results in a change in the phase of the signal 602 by approximately 180 degrees, while the inverted signal retains a frequency approximately resonant to the actuator.

Graph 601 shows the motion of two resonant actuators, the motion 604 of the first actuator is generated by driving the first actuator with the signal 602. The motion 605 of the second actuator is generated by a signal (not shown) similar to signal 602, however, the signal driving the second actuator is not inverted, but rather it is simply shut off at time=1 second to allow the resonant actuator to return to rest. As can be seen in graph 601, the motion 604 of the first actuator and the motion 605 of the second actuator are very similar for the portion of the graph 601 leading up to time=1 second when the signal 602 driving the first actuator is very similar to the signal driving the second actuator.

At time=1 second, the signal 602 driving the first actuator is inverted 603, while the signal driving the second actuator is shut off. As can be seen in graph 601, the motion 604 of the first actuator decreases to a resting state before time=1.05 seconds. While the motion 605 of the second actuator has not ceased by time=1.2 seconds. Thus, the inversion 603 of the signal 602 driving the first actuator results in a substantial decrease in the braking time of the resonant actuator as compared to the resonant actuator that has no braking force applied to it.

The signal 602 shown is merely a representative example of a signal configured to drive and brake an actuator. Other embodiments of the present invention may use different signals to drive and brake a resonant actuator. For example, signal 602 maintains its full amplitude after being inverted 603 and is applied to the actuator for a duration required to bring the actuator to rest. In other embodiments of the present invention, other signals may be used. For example, in one embodiment of the present invention, the signal driving the resonant actuator may be inverted and the inverted signal may have a lower amplitude than the signal used to drive the actuator. In another embodiment, the inverted signal may not be transmitted to the resonant actuator for a duration required to bring the actuator to rest. For example, the inverted signal may be transmitted to the resonant actuator for a duration required to conform the motion of the resonant actuator to a haptic envelope. In still a further embodiment, the inverted signal may be have a greater amplitude than the non-inverted signal.

General

The foregoing description of the embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the this invention.

That which is claimed is:

1. A method for braking an actuator comprising:
generating a first actuator signal having a frequency approximately resonant to the actuator, the first actuator signal configured to drive the actuator;
transmitting the first actuator signal to the actuator;
generating a second actuator signal having approximately the frequency of the first actuator signal and a phase approximately 180 degrees out of phase to the first actuator signal, the second actuator signal configured to cause a braking force on the actuator; and
transmitting the second actuator signal to the actuator, wherein generating the first actuator signal comprises:
generating a first rectangular wave having a frequency approximately resonant to the actuator,
generating a second rectangular wave having approximately the same frequency by logically exclusive-ORing the first rectangular wave with a digital signal in a first logic state; and
generating the second actuator signal comprises:
changing the digital signal to a second logic state,
generating a third rectangular wave having approximately the frequency of the first actuator signal and a phase approximately 180 degrees out of phase to the first actuator signal by logically exclusive-ORing the first rectangular wave with the digital signal in a second logic state.

2. The method of claim 1, wherein generating the first actuator signal further comprises transmitting the second rectangular wave through a filter configured to generate a substantially sinusoidal wave at approximately the same frequency as the second rectangular wave; and
generating the second actuator signal further comprises transmitting the third rectangular wave through the filter.

3. The method of claim 1, wherein the first actuator signal is configured to cause the actuator to generate a vibrotactile haptic effect.

4. The method of claim 1, further comprising generating a vibrotactile haptic effect envelope before generating the first actuator signal, wherein the first actuator signal comprises a modulated amplitude based at least in part on the vibrotactile haptic effect envelope, and the second actuator signal comprises an amplitude based at least in part on the vibrotactile haptic effect envelope.

5. The method of claim 4, wherein the vibrotactile haptic effect envelope comprises a substantially periodic signal having a frequency lower than the first and second actuator signals.

6. The method of claim 1, further comprising generating a vibrotactile haptic effect envelope before generating the first actuator signal, wherein the first actuator signal comprises a modulated amplitude based at least in part on the vibrotactile haptic effect envelope, and the second actuator signal comprises a duration based at least in part on the vibrotactile haptic effect envelope.

7. The method of claim 6, wherein the second actuator signal comprises a maximum magnitude.

8. The method of claim 1, further comprising:
generating a modulating signal configured to modulate the amplitude of the first and second actuator signals; and
combining the first and second actuator signals with the modulating signal such that the amplitude of the first and second actuator signals is changed based at least in part on the modulating signal.

9. A system for braking an actuator comprising:
an actuator; and
a signal generator in communication with the actuator, the signal generator configured to:
- generate a first actuator signal having a frequency approximately resonant to the actuator, the first actuator signal configured to drive the actuator,
- transmit the first actuator signal to the actuator,
- generate a second actuator signal having approximately the frequency of the first actuator signal and a phase approximately 180 degrees out of phase to the first actuator signal, the second actuator signal configured to cause a braking force on the actuator, and
- transmit the second actuator signal to the actuator, wherein the signal generator comprises:
- a rectangular wave generator configured to generate a first rectangular wave having a frequency approximately equal to the resonant frequency of the actuator;
- a signal inverter configured to:
  - generate a second rectangular wave having approximately the same frequency as the first rectangular wave and a phase approximately 180 degrees out of phase with the first rectangular wave, and
  - be either enabled or disabled;
- an amplifier configured to generate an amplified signal configured to drive the actuator
- a filter in communication with the signal generator, the filter configured to convert a rectangular wave to a substantially-sinusoidal wave of approximately the same frequency and phase as the first rectangular wave; and
- the amplifier is further configured to generate an amplified signal configured to drive the actuator based at least in part on the output of the filter.

10. The system of claim 9, wherein the first actuator signal is configured to generate a vibrotactile haptic effect.

11. The system of claim 9, wherein the signal generator is further configured to:
- receive a vibrotactile haptic effect envelope;
- generate the first actuator signal, wherein the first actuator signal comprises a modulated amplitude based at least in part on the vibrotactile haptic effect envelope;
- generate the second actuator signal, wherein the second actuator signal comprises an amplitude based at least in part on the vibrotactile haptic effect envelope.

12. The system of claim 9, wherein the signal generator is further configured to:
- receive a vibrotactile haptic effect envelope;
- generate the first actuator signal, wherein the first actuator signal comprises an amplitude based at least in part on the vibrotactile haptic effect envelope;
- generate the second actuator signal, wherein the second actuator signal comprises a duration based at least in part on the vibrotactile haptic effect envelope.

13. The system of claim 12, wherein the vibrotactile haptic effect envelope comprises a substantially periodic signal having an envelope frequency lower than the frequency associated with the first and second actuator signals.

14. A system for braking an actuator comprising:
an actuator; and
a signal generator in communication with the actuator, the signal generator configured to:
- generate a first actuator signal having a frequency approximately resonant to the actuator, the first actuator signal configured to drive the actuator,
- transmit the first actuator signal to the actuator,
- generate a second actuator signal having approximately the frequency of the first actuator signal and a phase approximately 180 degrees out of phase to the first actuator signal, the second actuator signal configured to cause a braking force on the actuator, and
- transmit the second actuator signal to the actuator, wherein the signal generator comprises:
- a rectangular wave generator configured to generate a first rectangular wave having a frequency approximately equal to the resonant frequency of the actuator;
- a signal inverter configured to:
  - generate a second rectangular wave having approximately the same frequency as the first rectangular wave and a phase approximately 180 degrees out of phase with the first rectangular wave, and
  - be either enabled or disabled;
- an amplifier configured to generate an amplified signal configured to drive the actuator, and wherein the first signal generator comprises a ripple counter.

15. The system of claim 14, wherein the first actuator signal is configured to generate a vibrotactile haptic effect.

16. The system of claim 14, wherein the signal generator is further configured to:
- receive a vibrotactile haptic effect envelope;
- generate the first actuator signal, wherein the first actuator signal comprises a modulated amplitude based at least in part on the vibrotactile haptic effect envelope;
- generate the second actuator signal, wherein the second actuator signal comprises an amplitude based at least in part on the vibrotactile haptic effect envelope.

17. The system of claim 14, wherein the signal generator is further configured to:
- receive a vibrotactile haptic effect envelope;
- generate the first actuator signal, wherein the first actuator signal comprises an amplitude based at least in part on the vibrotactile haptic effect envelope;
- generate the second actuator signal, wherein the second actuator signal comprises a duration based at least in part on the vibrotactile haptic effect envelope.

18. The system of claim 17, wherein the vibrotactile haptic effect envelope comprises a substantially periodic signal having an envelope frequency lower than the frequency associated with the first and second actuator signals.

* * * * *

UNITED STATES PATENT AND TRADEMARK OFFICE
CERTIFICATE OF CORRECTION

PATENT NO. : 7,639,232 B2  Page 1 of 1
APPLICATION NO. : 11/291207
DATED : December 29, 2009
INVENTOR(S) : Danny A. Grant et al.

It is certified that error appears in the above-identified patent and that said Letters Patent is hereby corrected as shown below:

Title page Item [56]
At Page 2, Column 1, Line 26 (Approx.), please delete "JP 1 428 299 A1   6/2004".

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,639,232 B2  Page 1 of 1
APPLICATION NO. : 11/291207
DATED : December 29, 2009
INVENTOR(S) : Grant et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1063 days.

Signed and Sealed this

Twenty-first Day of December, 2010

David J. Kappos
*Director of the United States Patent and Trademark Office*